May 15, 1928. 1,669,844

S. W. SPARKS

ROTATING VALVE COCK

Filed April 4, 1925 2 Sheets-Sheet 1

INVENTOR:
Stanley W. Sparks,
BY
His ATTORNEY

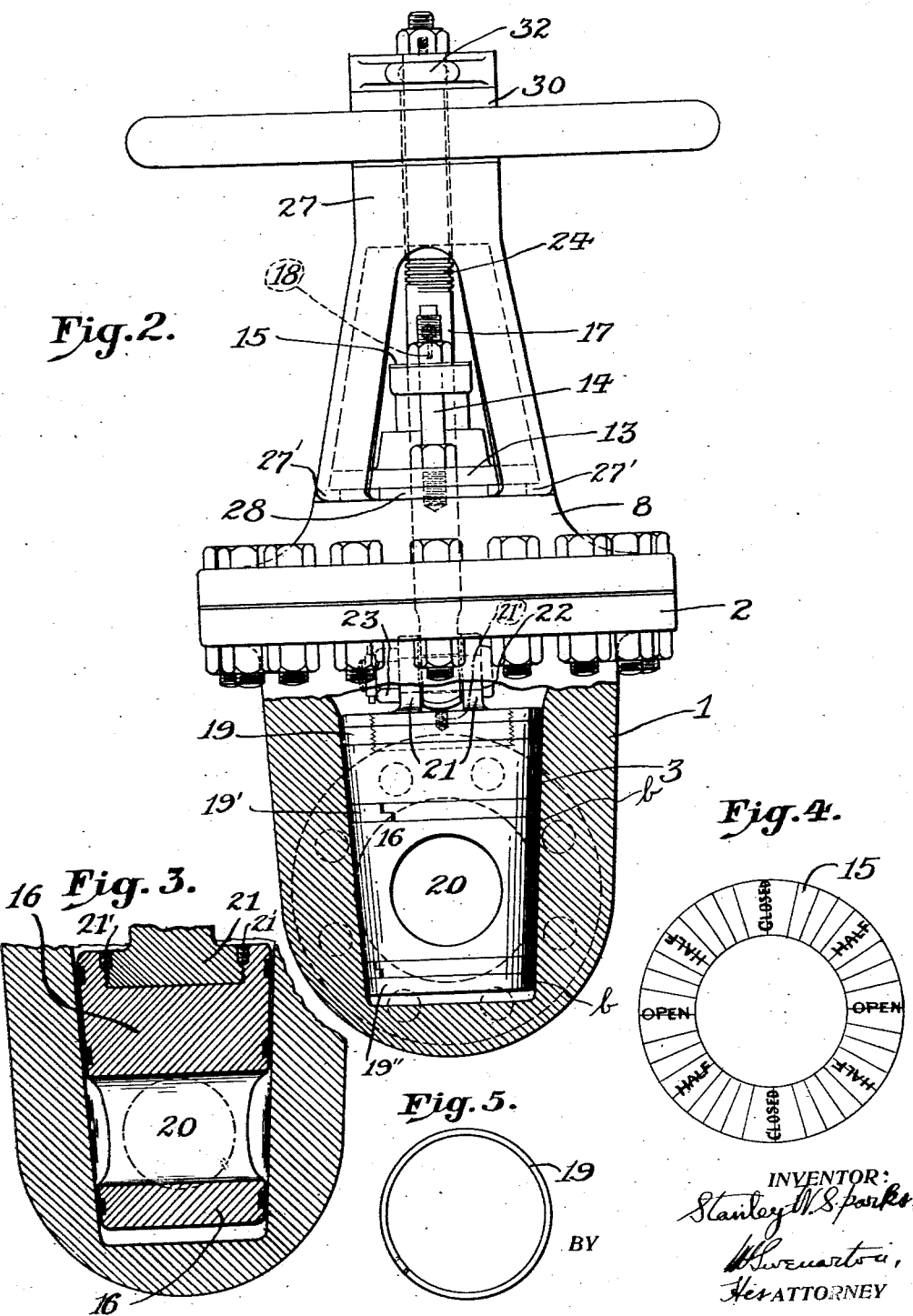

Patented May 15, 1928.

1,669,844

UNITED STATES PATENT OFFICE.

STANLEY W. SPARKS, OF SUMMIT, NEW JERSEY, ASSIGNOR, BY MESNE ASSIGNMENTS, TO THE HYTEST VALVE COMPANY OF NEW YORK, INCORPORATED, OF NEW YORK, N. Y., A CORPORATION OF NEW YORK.

ROTATING VALVE COCK.

Application filed April 4, 1925. Serial No. 20,831.

This invention relates to improvements in valve mechanism and has for its particular objects the provision of a plug valve cock which is peculiarly adapted for high pressure and high temperature operations, such for example as are commonly employed in the cracking of mineral oils, and which valve cock is extremely effective in preventing leakage, is readily adjustable and highly durable under high temperatures and pressure.

My preferred construction is set forth in detail in the following description and drawings forming a part thereof, in which latter Figure 1 is a vertical section of a valve embodying my invention;

Fig. 2 a partial transverse vertical section of the same construction;

Fig. 3 is a fragmentary vertical section of the same construction;

Fig. 4 is a plan of a dial;

Fig. 5 is a plan of a sealing ring and

Figure 1:
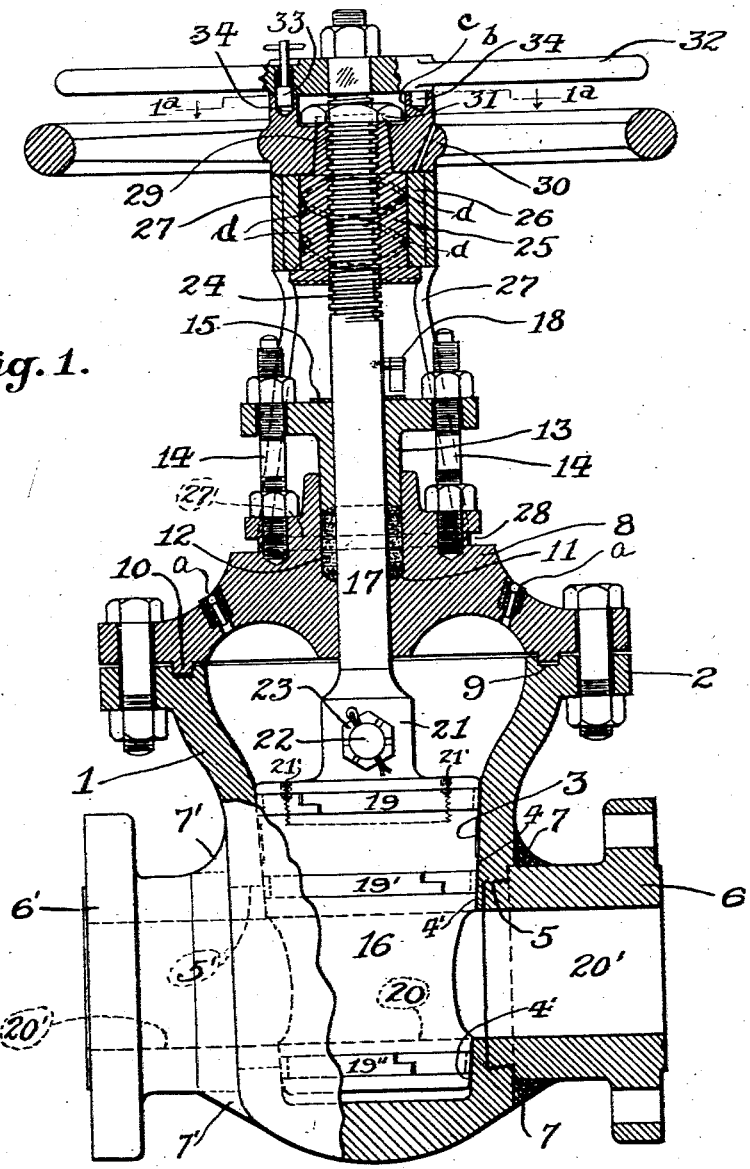
Figure 6:
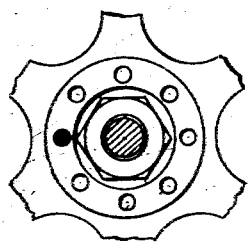
Fig. 6 is a fragmentary plan of the hand wheel, on the line 1ª—1ª.

Referring to the drawings and the construction shown therein, the reference numeral 1 designates a shell or body which can be formed by casting in the well-known manner or may be formed by forging, either billets, plates, sheets or tubular sections of steel or other suitable metal, by what is known as the extrusion method or by drawing, pressing or stamping operations. Preferably as shown, the original forged body is substantially cylindrical in shape and then is machined to the desired ultimate shape, though if desired, the forging may be a combination of cylindrical and oblong external shape.

Said body is provided with an integral circular flange 2 and a central machined tapered aperture 3, having accurately machined or ground seats 4, 4' which are adapted to engage the rotatable plug or cock member hereinafter described and to maintain a pressure-tight joint therewith when said cock is seated thereon.

The flat or oblong sides of said body 1 are provided with lateral circular apertures 5, 5' adjacent the bottom thereof, which may be formed by piercing, drilling or boring, which serve to receive threaded or flanged hub members 6, 6' by means of which latter the valve body is secured in any desired pipe line or conduit. While it is preferred that the links be separable from the valve body, nevertheless, if the latter is a casting, then such hubs are cast integral therewith. The joints between the said hubs and the respective lateral walls of said body are strengthened and sealed by means of a weld or fillet 7 formed by an electric welding operation and thereby the said hub members virtually form and become a part of the valve body.

A bonnet 8, circular in cross-section which is especially designed to withstand high temperatures and pressures, and is formed of forged or cast steel, preferably the former, is bolted to the flange 2, the latter being provided with an annular recess 9 into which the annular rib 10 of said bonnet is adapted to project. Said bonnet is provided with a central recess 11, open at its upper end, adapted to serve as a stuffing box and to receive packing 12, and is also fitted with three ball-and-socket pressure oilers $a$ through which proper heat resisting lubricant can be injected in order to lubricate the said cock or plug member and its parts and engaging seats 4, 4' within the body, and furthermore said pressure oilers admit of the injection under pressure of valve grinding material therethrough when it is desired to grind the valve seats and co-operating surfaces of the said cock and sealing rings, hereinafter referred to, in situ.

A gland 13 of the usual construction is adjustably secured by bolts 14 within said stuffing box and the upper face of said gland is provided with a dial or index plate 15 which serves as an indicator to show the exact position in the body 1 of a rotatable and longitudinally movable plug or cock member 16, the stem 17 of which carries a co-operating pointer 18, so that the operator can accurately throttle the valve to the desired extent.

The cock or plug member 16 which is rotatable and vertically movable within very restricted limits in the ordinary operation of the valve is provided with split sealing rings 19, 19' and 19" respectively, preferably of heat resisting metal as stainless steel (known as "S-Less"), Monel metal or "2600 steel", which serve to tightly seal the joint between the walls of the tapered recess or aperture 3 and the surface of said cock against the passage of oil, steam or like vapors or fluids even when the cock is slightly raised so that the annular machined or ground areas *b* thereof are out of engagement with the seats 4, 4' respectively.

Said cock or plug made of forged steel or heat resisting metal is provided with a transverse central cylindrical aperture 20, corresponding in diameter to the internal diameter of the conduits or passages 20' in the hub members 6, 6', with which latter passages it is adapted to register when the valve is open and partially so when the valve is employed for throttling, but when the valve is closed and re-seated, all passage through the aperture 20 in said cock of vapors entering said passage will be completely cut off. The yoke 21, to be made of either forged or cast metal to which the operating stem 17 is secured in the manner hereinafter explained, and which preferably is of forged steel, is threaded to the round top section of the plug or cock 16 and is further secured thereto by means of flat-head set screws 21' once same has been adjusted to its proper position relative to the aperture through said plug or cock 16. The reduced flattened lower end of the stem 17 is inserted between the two branches of the yoke 21 and secured thereto by means of a pin or bolt member 22 which projects through registering holes pierced in said stem and said branches of said yoke. A castellated unit 23, which is threaded on said bolt, is held in a locked position by a cotter pin. The upper end of stem 17 is threaded with so-called standard acme threads 24, on which is mounted a threaded nut bushing 25 which is fitted within a steel bushing or sleeve 26 secured within a yoke 27, by means of dowel pins (not shown) or otherwise. Said yoke is preferably formed of steel forging but can be made of cast steel, in which latter case, there will be no necessity for using a bushing or sleeve 26, and as shown, in either design is not integral with the bonnet 8, but is rigidly secured at its lower ends 27' in grooves 28 formed in the top of the bonnet 8.

At the upper end of said nut bushing is formed a tapered hexagon section 29, over which is fitted the hub of a hand wheel 30 of a diameter approximately the total dimension from flange to flange on the main body of the valve, which wheel is secured thereon by a hexagon lock nut 31 which is threaded onto the upper end of the bushing 25, the latter being countersunk into the upper surface of said wheel, as indicated by the reference letter *c*, so as not to interfere with the rotation of a hand lever 32 immovably mounted on the upper squared end of the stem and tightly locked or secured thereto by a lock unit 33. Said wheel 30 serves to rotate the bushing whereby the stem can be raised and lowered to any predetermined extent and without rotating plug or cock unless locking pin 33 is seated.

Said hand lever 32 is provided with a spring pressed pawl or locking pin 33 or other similar design of locking device which is adapted to co-operate with and project into holes or slots 34 drilled or machined in the top of said hand wheel 30 when brought into registry therewith. Preferably eight of these holes or slots are provided, the same being equidistantly disposed about a circle. The radius of said holes is not greater than one-half the distance between the outer circumference of the counter-sunk hole *c* in the hub of the hand wheel and the outside wall of the hub.

The nut bushing 25 is provided with spiral oil grooves *d* which hold the oil necessary for proper lubrication, and said bushing is so fitted within the steel sleeve 26 that the upward thrust is received upon the bottom flange of the bushing 25 and the downward thrust upon the hub of the hand wheel 30 tightly secured to the top shoulder of said bushing. Moreover the bottom flanged section of the bushing, engaging with the inside faces of the branches of the yoke 27 while said bushing is rotating, takes the thrust imparted by the rotation of the plug or cock 16.

In the operation of my improved valve, the first lifting and then rotating motion or vice versa, the first rotating and then lowering motion which admits of the indispensable, quick and definite opening or closing of the valve under extreme high pressures and temperatures without any distortion of or damage to the seats or permitting of seepage past the seats of distributive vapors or fluids and up into the bonnet or superstructure of sufficient pressure to deleteriously affect the packing in the stuffing box or the material of the superstructure, is as follows:

When the valve is in open position, the opposing handles of the hand lever will be parallel or in alinement with the aperture or conduit in the cock 16. The pawl 33 is first raised out of engagement with any of the holes 34 and the hand wheel is first rotated clockwise until the cock 16 has been lifted to the desired extent permitting a free rotating movement—the rotation of said wheel through a sufficient distance to cause said pawl to move from one recess and drop into the next adjacent recess is usually ample, although obviously by holding the pawl up and preventing it dropping into said holes until any desired degree of rotation has been affected, it is possible to raise the cock to any desired extent before rotating the same. Preferably, however, the coc should not be raised beyond the point at which the aperture therethrough will register with the apertures in the hubs 6, 6'. As soon as the cock 16 has been raised off its seats and the pawl 33 has been allowed to drop into one of the holes 34, the hand wheel becomes locked in engagement with the hand lever and consequently the cock 16 will be rotated to the desired position by the hand wheel and can therefore be either completely closed or partially throttled, but in order to firmly set the cock in the position desired, either closed, open or partly closed, the pawl 33 should be raised and hand lever 32 held firmly with one hand, while with the other hand the hand wheel is rotated in a reverse direction, thus tightly setting the plug cock 16 with its engaging seats.

To open the valve, the pawl is lifted or raised out of engagement with one of the holes 34, the hand wheel is then rotated in a clockwise direction until the cock has been raised away from its engaging seats. The pawl 33 in the hand lever will then enter one of the holes 34 in the hub of the hand wheel, thus allowing of the rotation of the hand wheel and the hand lever together and bringing the plug to the desired position as indicated by pointer 18. The pawl 33 is then again raised and the hand lever held by hand and the hand wheel rotated in a reverse direction.

Among the advantages of the above described valve construction may be mentioned its freedom from pockets or obstructions which would serve to collect coke or carbon if used in hot oil and choke up the line, and the ease with which the same can be cleaned by means of a tube cleaner to remove deposits inside the valve and conduits. Furthermore, the upper structure of the valve is substantially free from pressure or deposits of carbon or other deteriorating matter, since the valve, as constructed, does not permit the passage of pressure past the sealing rings while the valve is opened, closed or throttled, or in the process of being opened, closed or throttled, and as a consequence, the upper structure always remains cool and stuffing box troubles, due to excessive pressures having deleterious action on the packing, are avoided. The valve is peculiarly adapted for working under high pressures and temperatures, for example, pressures up to 600 lbs. at temperatures of 1,000° F., such as are encountered in tar and hot oil lines, particularly in oil cracking operations, or up to 2500 lbs. pressure when used as drilling valves, since the initial upward movement which occurs when the valve is first operated, prevents the possibility of the cock sticking under such temperatures and pressures, irrespective of whether coke deposits or other foreign matter have collected in the joints between the cock and valve body. The indicator connected to the valve stem invariably indicates the exact position of the cock valve during operation and thus the operator is at all times informed as to the exact position of the openings in the cock while the valve is in operation.

Among the various application in addition to those mentioned for which my valve is peculiarly adapted, are for employment in super-heated steam lines where the quick opening and closing of the valves are necessary and for which purpose throttled valves are used; also for use as stop valves on boilers or auxiliary steam lines and for boiler blow-off valves or cocks, since this type of valve is peculiarly adapted to prevent the tendency of the valves to stick as is often now the case due to the distortion thereof by excessive temperatures or the corrosion or collection of coke or scale on the valve seats, and furthermore, this valve is especially adapted for high pressure oil-pipe-line services where quick operation and positive opening and closing of valves under high pressure operating conditions are necessary, and in addition to such uses, for use in drilling oil or gas wells as a substitute for what is commonly known as the drilling through valve, since the same permits of a straight and unobstructed passage through the hub and conduits of the body of the drilling tools when the plug or cock is in an open position, thus eliminating the necessity of recessed or enlarged seats such as are commonly used in wedge or double disc drilling valves and especially since the construction of the plug or cock serves to further prevent the passage of sand, rock or other foreign substance into the upper part of the valve body and allows a quick and positive operation of the valve under excessive casing head pressures, such as occur in many oil fields. While the present drilling through valves require many turns of the hand wheel necessitating at times serious delays in attempting to shut off the valves after a well has been drilled in which delay is often fatal and results in such well being entirely lost on account of sand and rock lodging in the valve body which prevents the closing of the valve at the critical moment, it is possible with my valve to effect the quick and positive closing or opening of the valve by but a fractional turn of the hand wheel in one or the other direction requiring one or two seconds as against some thirty or forty seconds now required for operating such drilling through valves.

While I have illustrated a preferred form of my invention which in places will give satisfactory and reliable results, it is understood that various modifications of such invention consisting of other arrangements and organizations of the various parts within the scope of the appended claims can be made without departing from the spirit of my invention as covered thereby.

Having thus decribed my invention, what I claim and desire to obtain by United States Letters Patent is:

1. In a fluid control valve mechanism, the combination comprising a valve body casing having a valve chamber conforming substantially to a truncated cone in configuration, and said valve body having aligned apertures extending through the opposite sides of said chamber and circular valve seats positioned immediately adjacent above and below said apertures, hub members, each having a central conduit, mounted in said apertures, a cock member, also substantially conforming to a truncated cone in configuration, provided with a transverse conduit conforming in cross-section to the conduits in said hubs and which is adapted to register with the conduits in said hubs when said cock is in its lower-most position and is in engagement with said valve seats, annular sealing rings mounted in said cock above and below the conduit therein, each of said rings being capable of compression to an external diameter not exceeding the minimum diameters of the walls of the chamber engaged by such rings when the cock is seated, a centrally apertured bonnet member provided with a central stuffing box adjacent the outer end of said aperture secured to the top of said valve body, a valve stem secured to the large end of said cock and projecting through the aperture in said bonnet and said stuffing box thereof, said valve stem being threaded at its outer end, a yoke member embracing said stem beyond said bonnet and secured to said bonnet, a threaded bushing member adapted to have threaded engagement with said stem, said bushing being mounted within said yoke and capable of rotation with respect thereto, manually operable means fixedly secured to the outer end of said bushing for operating the same, supplemental manually operable means fixedly secured to the outer end of said stem at a point beyond the first mentioned manually operable means, which latter is adapted to move relative to said second mentioned manually operable means when it is desired to effect vertical movement of said cock without rotation thereof, means for optionally locking said manually operable means together, whereby the same are required to operate simultaneously and effect a rotating movement of the valve cock without changing the vertical position thereof when desired, and indicator means for indicating the rotative position of the conduit in said cock member with respect to the conduits in said hub members.

2. In a fluid control valve mechanism, the combination comprising a body casing having aligned inlet and outlet apertures and provided with annular valve seats above and below such apertures, hub members provided with central conduits therethrough respectively secured in said inlet and outlet apertures, a valve cock member having a central conduit therethrough which is so positioned as to register respectively with the conduits in said hub members when said valve cock is seated, a centrally apertured bonnet member secured to and closing the top of said body casing, a valve stem secured to said valve cock and projecting centrally through the central aperture of said bonnet member, said valve stem being provided with a threaded portion adjacent its outer end, packing means for preventing the escape of a fluid between said valve stem and the walls of the central aperture in said bonnet member, a threaded bushing adapted to have engagement with the thread on said valve stem and permit of movement of said valve stem with respect to such bushing, supporting means for said bushing and preventing vertical movement thereof during the movement of said valve stem therein while permitting of the rotation of said bushing with respect to such supporting means, means for effecting rotation of such bushing and for optionally effecting vertical movement of said valve stem in said bushing without rotation of said valve stem when it is desired to effect a lifting movement of said cock member, locking means for interconnecting the two last mentioned means when it is desired to effect rotative movement of said cock member and indicator means for showing the exact rotative position of the conduit in said valve cock with respect to the conduits in said hubs.

3. A worked metal valve comprising a tapered apertured main body, having a central valve chamber provided with aligned apertures extending through the opposite sides of said chamber, to which are attached hub members, a rotatable cock member for controlling the flow of fluid through said apertures, valve seats adjacent said apertures adapted to co-operate with said cock member, a superstructure attached to said main body and manually operated means on said super-structure for rotating and lifting the cock member.

4. In a valve mechanism for controlling the flow of fluid therethrough, a combination the worked metal valve body comprising, provided with a chamber having inlet and outlet apertures, an apertured bonnet secured to said casing, an apertured valve cock positioned in said chamber, a valve stem projecting through said bonnet, means for optionally moving said cock vertically without rotation and for rotating said cock without vertical movement of the valve and means for indicating the rotative position of the apertures in cock relative to the inlet and outlet apertures in body.

5. In a valve mechanism for controlling the flow of fluid therethrough, a combination comprising a worked metal valve body, provided with a chamber having inlet and outlet apertures, an apertured bonnet secured to said body, an apertured valve cock positioned in said chamber, a valve stem projecting through said bonnet, means for optionally moving said cock vertically without rotation and for rotating said cock without vertical movement of the valve and means for indicating the rotative position of the apertures in cock relative to the inlet and outlet apertures in body.

Signed at New York in the county of New York and State of New York this 2nd day of April, 1925.

STANLEY W. SPARKS.